March 11, 1941.    T. W. EVANS ET AL    2,234,400
PURIFICATION OF POLYHYDRIC ALCOHOLS
Filed June 10, 1939
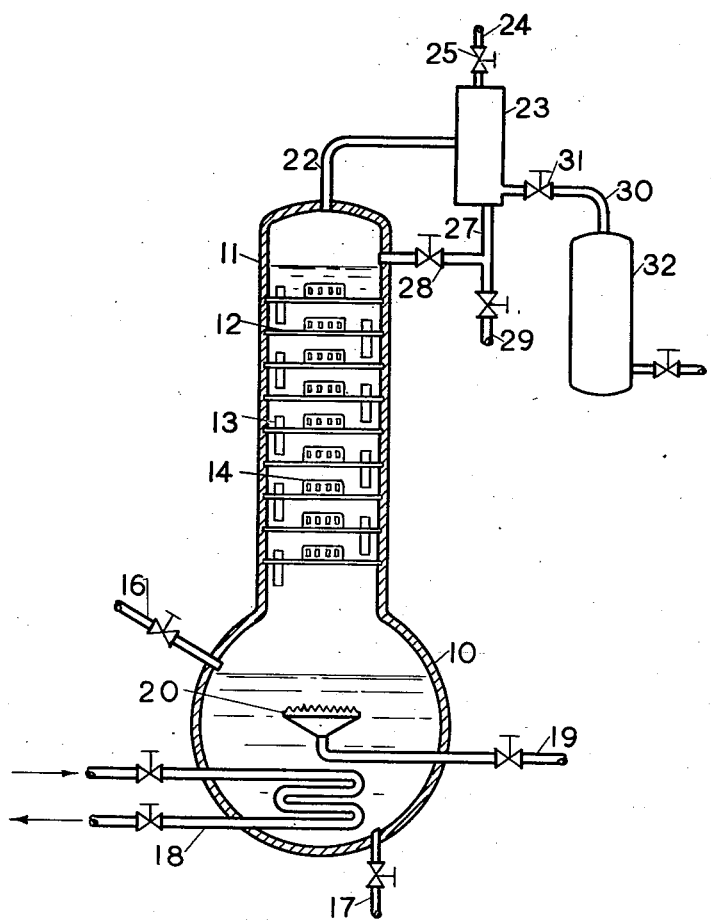
Inventors: Theodore W. Evans
James R. Scheibli
Gerald H. van de Griendt
By Their Attorney:

Patented Mar. 11, 1941

2,234,400

UNITED STATES PATENT OFFICE 2,234,400

PURIFICATION OF POLYHYDRIC ALCOHOLS

Theodore W. Evans and James R. Scheibli, Oakland, and Gerald H. van de Griendt, San Francisco, Calif., assignors to Shell Development Company, San Francisco, Calif., a corporation of Delaware Application June 10, 1939, Serial No. 278,480

10 Claims. (Cl. 202—46)

The present invention relates to a process for treating polyhydric alcohols, and more particularly pertains to a process for the removal of certain undesirable constituents such as ash-forming, color-producing, odorous and/or odor-forming impurities, esters, aldehydes, etc., from glycerin, whereby a substantially pure and practically anhydrous glycerol may be produced.

In the generally employed methods for recovering glycerol from the dilute aqueous solutions containing glycerin and the mentioned impurities, the concentration of the glycerin stock (such as, for example, obtained as a by-product in the production of soaps, fatty acids, etc.) is usually preceded by a chemical treatment to remove as much of these impurities as possible. After concentration to about 80% or thereabouts, the crude glycerin thus produced, being still very impure, is then subjected to one or more steam distillations under vacuo and may be subjected to a chemical treatment, such as with decolorizing or activated charcoal, to remove most of the color-producing impurities. The so-called C. P. (chemically pure), U. S. P. and other high-grade glycerols thus produced and sold as articles of commerce, although quite pure and free from some of the easily removable impurities, frequently contain other types of impurities, especially those tending to produce coloration and objectionable odor upon aging.

The glycerin produced synthetically from hydrocarbons, as for example by the hydrolysis of glycerol dichlorhydrin, monochlorhydrin or trichlorhydrin, also contains impurities even after being subjected to repeated distillations in vacuo. Thus, such concentrated and distilled glycerins, although they are exceptionally free from impurities of the type of trimethylene glycol and/or methyl glycerol, still contain traces of chlorine, coloring matter, odorous substances and other impurities which render the glycerin unfit for certain exacting uses.

Recent developments, however, such as the advent of Cellophane, synthetic resins, etc., not only have greatly increased the consumption of polyhydric alcohols, such as glycerol, but also have dictated new and exacting requirements and specifications, particularly as to purity. Thus, as an example, glycerol used as a plasticizing agent in Cellophane must meet very stringent specifications, and is sometime designated as very pure glycerol. Actually, however, the glycerin used for this purpose frequently contains a considerable amount of impurities which, nevertheless, exert no or little detrimental effect so far as Cellophane plasticizing is concerned. On the other hand, in the manufacture of certain synthetic resins, the presence of these or like impurities is to be avoided as far as possible.

It is therefore the main object of the present invention to provide a method whereby the above and other impurities present in polyhydric alcohols may be efficiently removed. It is a further object of the invention to provide a process whereby a glycerol of high degree of purity may be produced economically and on an industrial scale.

It has now been discovered that at least a substantial portion of the impurities found in the so-called chemically pure, U. S. P. glycerin, and in other types of high-grade glycerins, are materials which are capable of reacting with strong bases. Also, it was found that certain impurities in the glycerin produced synthetically from hydrocarbons and refined by known methods including the process described in the U. S. Patent No. 2,154,930, still contain materials capable of reacting with strong bases of the type of sodium hydroxide. While there is no intention of limiting this invention by the soundness or accuracy of any theories presented as to the nature or character of such alkali-reactive impurities, it is believed at the present time that the impurities responsible for the deterioration and the observed unsatisfactory action of many of the so-called chemically pure glycerols are, in most cases, predominantly ester-type bodies. It is also considered that these ester-type bodies comprise the major proportion of the impurities present in synthetically produced glycerins which have been refined according to the hitherto known processes, these impurities, although not removable by these known purification methods, being nevertheless capable of reacting with strong bases. Furthermore, it has been stated that the glycerins refined as described above still contain some odorous materials which remain even after exacting treatments of the glycerin. Because of their peculiar characteristics, it is believed that these odorous bodies are aldehydic and hydroxy-ketonic in nature.

Although previous attempts have been made to remove these impurities from the partially refined concentrated glycerins, a careful investigation of the behavior of the alkali-reactive compounds has demonstrated that these undesirable ingredients, predominating in ester-type bodies, cannot be efficiently removed from glycerin by any of the hitherto known and used refining processes even though, upon first consideration, their removal by the known methods would be expected to be simple and complete. Thus, although some of the impurities, and particularly certain color-forming bodies present in concentrated glycerin, may be removed by extraction, according to the process described in U. S. Patent No. 2,154,930, with a suitable glycerol-immiscible solvent such as xylene, some of the alkali-reactive or ester-type bodies, being highly soluble in anhydrous or substantially anhydrous glycerol, will remain in the glycerol even though such solvent extraction is executed at elevated temperatures. Also, these objectionable impurities, as well as certain odorous bodies of the type of aldehydes and hydroxy ketones, which remain in glycerins purified according to the known processes, distill together with the glycerol throughout the entire distillation even when the glycerin is distilled while in a slightly alkaline state. Even ordinary steam distillation, whether under a vacuo or not, is ineffective as far as the separation of these ester-type bodies is concerned. Thus, the condensates obtained during such distillation are found to contain excessive quantities of these impurities.

It is therefore a still further object of the present invention to provide a process of removing the above-mentioned alkali-reactive, ester-type and/or odorous substances present in partially purified glycerin. A further object is to provide a process wherein such impurities may be economically removed on an industrial scale and without any substantial loss of glycerol.

It has now been discovered that the above and other objects may be attained by subjecting the glycerin containing the afore-mentioned ester-type and/or odorous materials to a vacuum distillation with substantial refluxing of the overhead glycerin distillate. It has also been discovered that when the relatively concentrated, partially purified glycerin containing the described odorous and ester-type bodies is distilled under a vacuum, while blowing with steam, and with a simultaneous return of a substantial portion of the overhead glycerin distillate as reflux, such a treatment causes the concentration of the major portion of the impurities in the first fraction or cut to distill over. During such steam distillation, it is advantageous to maintain the glycerin condenser at a temperature at which such impurity-containing glycerol would condense with substantially no condensation of the steam. The latter may then be condensed separately. This water condensate contains the major portion of the odorous materials.

In order to effect the concentration and substantial removal of the odorous and alkali-reactive or ester-type bodies according to the present invention, the glycerin containing these impurities is, therefore, first subjected to a steam distillation under a vacuum, the overhead distillate, after passing through a fractionation column, being fractionally condensed to liquefy the impurity-containing glycerin while allowing the steam (containing most of the odorous bodies) to pass to a second condenser. The major portion of the impurity-containing glycerin is returned back into the fractionation zone, this glycerin acting as the refluxing medium. The remaining portion of the glycerin condensate is withdrawn from the system. As stated, such a treatment causes the concentration of the impurities and particularly of the ester-type bodies, in the first or "fore-cut" of the glycerin to distill over. Another advantage resides in the fact that the odorous materials are removed by the steam, which latter does not dilute the treated glycerin because of the separate fractional condensation of the two materials.

The concentration and removal of the greater portion of the odorous and ester-type impurities in the first fraction of glycerin to distill over, markedly decreases the impurity content of the remaining fraction. Therefore, after the separation or removal of the "fore-cut", it is possible to distill and collect a large proportion of substantially pure glycerol, this fraction (usually called the "heart-cut") containing substantially no, or at least very small and permissible percentages of the mentioned impurities. This distillation of the substantially pure glycerol fraction is preferably effected under vacuum and without introduction of steam, thereby avoiding dilution of the glycerol fraction and at the same time lowering the distillation temperature and thus preventing cracking or decomposition of the glycerol.

It is to be noted that the refluxing of a substantial portion of the glycerin overhead during the first part of the distillation is essential for the concentration of the alkali-reactive impurities. Thus, whereas excellent results were obtained by effecting the distillation according to the present invention, it was found that substantially all of the impurities remained in the glycerin when the treatment was effected by mere blowing of the glycerin with steam or when the impurity-containing glycerin was subjected to an ordinary steam distillation.

The magnitude of the first cut obtained during the steam distillation with refluxing, will vary depending on the character and percentages of the impurities present in the glycerin to be treated. Usually, for each stock to be distilled according to the present invention, it is preferable to continue the vacuum distillation with steam and with refluxing until the overhead fraction begins to show an ester content of about or slightly above that allowable in the glycerol to be distilled over as the "heart-cut". The reason that it is permissible to terminate the first distillation prior to the moment at which the ester content is at or below the allowable, is that it has been found that there is a marked drop in the ester content between the fraction produced by steam distillation with refluxing and the glycerol "heart-cut" obtained immediately thereafter by vacuum distillation without steam. Such drop is believed to be caused by the concentration of the esters in the "fore-cut" obtained during the vacuum distillation with steam and refluxing of a substantial portion of the overhead glycerin condensate, such concentration reducing the impurity content of the remaining undistilled glycerin. As an example, when an impurity-containing glycerin was subjected to a treatment according to the present process, whereas the last 4% (as based on the volume of the glycerin treated) distilled over under vacuum, with steam and with the afore-mentioned substantial refluxing, had an alkali-reactive compound content equivalent to 3.4 cc. N—NaOH/100 gm. of glycerol (as determined by the U. S. Pharmacopaeia method for determining acid and ester contents of glycerols), the succeeding 6.3% of glycerol distilled over under vacuum but without steam introduction had an ester content of only 0.43 cc. N—NaOH/100 gm. of glycerol. Usually, it may be stated that most of the relatively volatile impurities may be concentrated and removed in the first 5 to 10% of of the glycerin distilled over according to the present invention. However, in some cases, where the glycerin to be treated contains relative high percentages of these impurities, it may be desirable to remove up to about 20 to 25% of the glycerin before the glycerol fraction distilled over under vacuum, and preferably without steam, has a negligible or at least an allowable content of ester-type bodies.

In this connection it must be stated that the treatment of the glycerin according to the present process accomplishes a dual effect. Thus, the first vacuum distillation with substantial refluxing and with the use of steam effects concentration of the impurities, and particularly of the ester-type bodies, in the first fraction of the glycerin to be distilled. On the other hand, the subsequent vacuum distillation of the remaining glycerin without steam avoids the undesirable dilution of the substantially pure glycerol thus recovered. During both distillations it is advisable, if not essential, to provide at least partial fractionation of the material being distilled.

Since the glycerin subjected to the treatment according to the present process contains certain relatively heavy impurities boiling above glycerol, the distillation and recovery of the glycerol "heart-cut" should be terminated prior to the vaporization of these impurities. In normal operations this second distillation is usually terminated when about 5 to 10% of the charge remains in the still as a residue. Obviously, the point at which the distillation of the substantially pure glycerol fraction is to be stopped depends on the character and magnitude of these relatively heavy impurities.

During the reflux distillation with steam to recover a concentrated "fore-cut" containing most of the ester-type impurities, the vacuum should preferably be sufficient to vaporize these impurities. When operating at the distillation temperature of glycerol, excellent results are obtainable at pressures of between about 10 and 15 mm. of mercury. Although somewhat higher and lower pressures are permissible, it is preferred to operate above about 6 to 7 mm. of Hg. As to the vacuum distillation without steam, i. e. vacuum distillation of the "heart-cut," any possible or economic vacuum may be used since the sole purpore thereof at this stage of operation is to lower the distillation temperature, thereby preventing decomposition of the glycerol. Excellent results have been obtained when this distillation was effected at about 1 to 3 mm. of mercury.

It was brought out that the condensing of the overhead distillate during the first portion of the distillation, and the return of a substantial portion of such condensate for purposes of refluxing, concentrates the impurities in the first fractions of glycerin to distill over. In some cases the use of steam during this reflux distillation may be avoided. However, in most cases, and particularly when dealing with concentrated, partially purified glycerin derived synthetically, for example, from the hydrolysis of chlorhydrins, the use of steam aids in the concentration of these ester-type bodies, thus markedly increasing the percentage of substantially pure glycerol which may be obtained from any given glycerin stock.

If it is desired to remove the odorous substances prior to the concentration of the ester-type bodies, the vacuum distillation with steam may be effected under conditions at which the whole glycerin overhead is condensed and refluxed back, while allowing the steam (together with the odorous bodies) to be removed from the system. Thereafter, when these substances have thus been separated, it is possible to proceed according to the described process to concentrate the ester-type bodies in the fore-cut.

To facilitate understanding of the process of the invention, reference is made to the accompanying drawing which illustrates diagrammatically a suitable method for executing the same. In this drawing, a still 10 is provided with a bubble tower 11 superimposed thereon, this tower containing the usual plates or other suitable contact elements 12, and being equipped with the necessary overflows 13 and bubble caps 14. The still is also equipped with a valved line 16 for the introduction thereinto of the glycerin to be purified, and with a valved discharge line 17 for the withdrawal of the residue remaining in the still after the termination of the distillation. The heating of the glycerin in the still (although this may be effected in any manner) is realized by means of a heating fluid conveyed through a coil 18 disposed in the lower portion of the still. Steam is introduced through a valved line 19, the terminal end of which is provided with a nozzle 20. A line 22 connects the upper end of bubble tower 11 with a condenser 23 which is cooled by any known and desired means, such as water. A vent line 24 equipped with a valve 25 leads out from the top of the condenser and may be connected to a vacuum pump, or the like (not shown in the drawing) to maintain a subatmospheric pressure in the system. Refluxing of the condensate from condenser 23 is effected via line 27 provided with valve 28, this line being also provided with a valved discharge line 29 for the removal of condensate in excess of that necessary for refluxing. Another line 30 provided with valve 31 leads to a tank 32 employed for the storage of the purified glycerin.

In operation, still 10 is charged via line 16 with a batch of the glycerin to be distilled. The distillation is then initiated by passing a suitably heated medium through coil 18, steam being simultaneously injected into the glycerin through line 19 and nozzles 20. The rising vapors pass through bubble tower 11 and line 22, and are thus conveyed into condenser 23 maintained at such a temperature that the glycerin and the alkali-reactive impurities are condensed, while the steam and the odorous bodies pass out of the system through line 24. In order to concentrate the aforementioned impurities according to the present process, most of the condensate is returned from condenser 23 via line 27 back into tower 11, while only a minor portion of this condensate is withdrawn through line 29. This steam distillation with refluxing is continued until most of the alkali-reactive impurities have been concentrated in the overhead fraction, at which time this fraction may be withdrawn through line 29. Thereafter, the distillation of the substantially pure glycerol is effected (with or without steam injection) by continuing the heating of the contents of still 10. The overhead "heart-cut" is now conveyed via line 30 into container 32. During this phase of distillation, valve 28 is maintained closed. Also, the valve on line 29 is kept in closed position, while valve 31 is open. At the termination of the above distillation, the residue remaining in still 10 is withdrawn via line 17, and the still is then ready for the purification of a new batch of glycerin.

The following examples are submitted solely to illustrate suitable executions of the present invention and the benefits derived therefrom, and are not to be considered as limiting the invention to any specific temperatures, pressures, magnitudes of the various fractions, and the like.

*Example I*

A volume of concentrated glycerin obtained by synthesis of petroleum hydrocarbons and refined according to the process covered by U. S. Patent No. 2,154,930, was divided into two portions. The first portion was subjected to a vacuum distillation with steam and with substantial refluxing until about 20% of the charge was removed as the "fore-cut." The second portion was distilled under vacuum but without introduction of steam. The alkali-reactive content of the overhead fraction of the first portion dropped below the allowable maximum before about 20% of the charge were removed, so that a substantially pure glycerol cut of about 75% of the charge was obtainable (the remaining 5% comprising a residue containing high boiling impurities). On the other hand, the distillate obtained from the distillation of the second portion contained an excessive amount of the ester-type bodies even when 50% of the charge were distilled over.

*Example II*

A volume of concentrated glycerin derived from the synthesis of hydrocarbons was divided into two portions. Portion I was fractionally distilled with refluxing under about 1 to 2 mm. Hg pressure, but without the use of steam. As to the second portion, it was treated as follows: During the first part of the distillation (until about 24.8% of the charge were recovered as overhead), the charge was maintained at an average pressure of between about 10 and 15 mm. of mercury, steam being continuously passed through the glycerin, and a substantial portion of the overhead glycerin condensate being used as a reflux. Thereafter, the remaining glycerin was distilled without steam but with refluxing and at about 1 to 2 mm. mercury pressure. The following table gives the alkali-reactive contents of the various fractions obtained during these two distillations.

| | Portion I | | | Portion II | |
|---|---|---|---|---|---|
| Fraction | Percent of charge as overhead | Alkali-reactive bodies cc. N—NaOH/100 gm. | Fraction | Percent of charge as overhead | Alkali-reactive bodies cc. N—NaOH/100 gm. |
| 1 | 10.1 | 32.0 | 1 | 8.2 | 43.3 |
| 2 | 20.4 | 5.5 | 2 | 13.6 | |
| 3 | 25.8 | 3.2 | 3 | 16.8 | 10.5 |
| 4 | 31.3 | 2.4 | 4 | 20.7 | 7.6 |
| 5 | 41.4 | 1.44 | 5 | 24.8 | 4.1 |
| 6 | 51.5 | 1.02 | 6 | 35.1 | 0.75 |
| 7 | 61.9 | 1.02 | 7 | 45.4 | 0.55 |

The table clearly indicates that the overhead distillate obtained without the use of steam still contained excessive quantities of impurities even after more than 60% of the charge were removed as overhead, it being noted that an ester content equivalent of 1.02 cc. N—NaOH/100 gm. of glycerol is excessive in glycerin to be used for Cellophane plasticizing. On the other hand, when the distillation was effected according to the present invention with steaming, a satisfactory glycerol was obtained after the removal of 25% of the charge as the "fore-cut."

Although the above disclosure was made with reference to the use of steam during the reflux vacuum distillation of the "fore-cut," it is also possible to employ superheated steam, which, under proper operating conditions, is additionally beneficial in that it may impart the necessary heat for the distillation.

It has been found that the present method of operation is particularly suitable for the removal of certain odorous and alkali-reactive or ester-type compounds from glycerol synthesized from petroleum hydrocarbons, as, for example, obtained by the hydrolysis of halohydrins. Also, this method is especially suitable for the purification of glycerin which has been solvent extracted. However, it is to be understood that the invention is also applicable to the purification of other glycerin stocks, whether previously distilled and/or solvent treated, and to the treatment of polyhydric alcohols, such as ethylene glycol, erythritol, their homologous and analogous substances, etc., when contaminated with impurities of the character described.

The above described process of purification is particularly applicable to the treatment of aqueous polyhydric alcohol solutions, such as glycerin solutions, of concentrations above about 90%, and especially concentrated solutions of above about 95%. Therefore, the term "concentrated" as employed herein refers to such solutions containing less than 10% and preferably below about 5% of water.

While the above description presented in some detail the preferred embodiment of the present invention and some variants thereof, it will be understood that this is only for the purpose of making the invention more clear and that the invention is not to be regarded as limited to the details of operation described, nor is it dependent upon the soundness or accuracy of the theories which have been advanced as to the reasons for the advantageous results attained, it being understood that the invention is to be coextensive with the scope of the appended claims.

We claim as our invention:

1. In a process for recovering a substantially pure glycerol from a glycerin produced synthetically from hydrocarbons or by the hydrolysis of halohydrins, said glycerin although having been subjected to purification and concentration, still containing excessive quantities of odorous and alkali-reactive impurities, such as ester-type bodies boiling slightly below and above the boiling point of glycerol, the improvement which comprises subjecting said impurity-containing glycerin to a distillation in vacuo while blowing steam through said impure glycerin, conveying said distillate through a fractionation zone and then to a partial condensing zone, maintaining said condensing zone at a temperature sufficient to liquefy the ester-containing glycerol but insufficient to condense the steam and most of the odorous bodies removed thereby, returning a major portion of said condensate back into the fractionation zone thereby condensing said ester-type bodies in the first portion of the glycerin to be removed as distilled condensate while removing only a minor portion of the condensate from the system, continuing said vacuum distillation with steam and with refluxing until the overhead glycerin distillate contains only a small percentage of said alkali-reactive impurities, vacuum distilling overhead the remaining glycerin fraction as a separate fraction with refluxing but without steam distillation, thereby separating a substantially anhydrous, pure glycerol fraction, and terminating said last-mentioned distillation prior to the vaporization of the relatively higher boiling impurities present in the glycerin treated.

2. In a process for recovering maximum amounts of a substantially pure glycerol from a synthetically produced glycerin which, although partially purified, still contains excessive amounts of odorous and alkali-reactive impurities, such as ester-type bodies, boiling slightly above and below the boiling temperature of glycerol, the improvement which comprises subjecting said impurity-containing glycerin to a distillation under a vacuum and with concurrent passage of steam through said glycerin, conveying the overhead fraction thus produced into a partial condensation zone maintained under conditions of temperature and pressure such that the ester-containing glycerol is liquefied while the steam and most of the odorous bodies removed thereby remain uncondensed, continuously returning a major portion of said condensate as reflux back into the fractionating zone, thereby concentrating said ester-type bodies in the first portion of the glycerin to be removed as distilled condensate, continuing said vacuum distillation with steam and with refluxing until the overhead glycerin distillate contains only a small percentage of said alkali-reacting impurities, and separately vacuum-distilling the remaining undistilled glycerin fraction with reflux and in the absence of steam to separate as an overhead distillate a substantially anhydrous, pure glycerol fraction.

3. In a process for recovering a substantially pure glycerol from a glycerin such as derived by synthesis from hydrocarbons, said glycerin, although partially purified, still containing excessive quantities of alkali-reactive impurities, such as ester-type bodies boiling slightly below and above the boiling point of glycerol, the improvement which comprises distilling said impurity-containing glycerin under a vacuum and with concurrent passage of steam through said glycerin, condensing the impurity-containing overhead distillate, continuously returning into the distillation zone a major portion of said glycerin condensate as reflux, thereby concentrating the alkali-reactive impurities in the first portion of glycerin to distill over, continuously withdrawing a minor portion of said impurity-containing glycerin overhead out of the system, returning the remainder as condensate refluxing medium, continuing said distillation until the overhead glycerin distillate contains only a small percentage of said alkali-reactive impurities, vacuum distilling overhead the remaining glycerin fraction as a separate fraction, with refluxing and without steam introduction, thereby recovering a substantially anhydrous, pure glycerol fraction, and terminating said last-mentioned vacuum distillation prior to the vaporization of the relatively higher boiling impurities present in the glycerin treated.

4. In a process for recovering a substantially pure and anhydrous glycerol from a glycerin solution containing excessive quantities of odorous and alkali-reactive impurities, such as ester-type bodies, boiling slightly above and below the boiling temperature of glycerol, the steps of subjecting said glycerin to a vacuum distillation with concurrent steaming, condensing the overhead impurity-containing glycerin, returning a major portion thereof as a refluxing medium while removing the excess condensate, thereby concentrating the alkali-reactive impurities in the first portion of the glycerin to be distilled over and removed from the system, continuing said steam distillation until the overhead fraction contains only a small and allowable percentage of said alkali-reactive impurities, and separately distilling overhead the remaining undistilled glycerin under vacuo and without steaming, thereby recovering a substantially anhydrous and pure glycerol fraction.

5. In a process for the recovery of a substantially pure glycerol from a relatively concentrated glycerin solution containing excessive quantities of alkali-reactive impurities such as ester-type bodies, which boil in the neighborhood of the boiling temperature of glycerol, the steps of vacuo distilling said glycerin, condensing the overhead fraction, returning a major portion of said condensed glycerin distillate as refluxing medium, thereby concentrating the impurities in the first portion of the glycerin to distill over, continuously removing the portion of the distillate in excess of that employed for refluxing, continuing said distillation until the overhead distillate contains only small and allowable percentages of said alkali-reactive impurities, and separately distilling the remaining glycerin overhead thereby recovering a relatively large yield of a substantially pure, anhydrous glycerol.

6. In a process for removing odorous and alkali-reactive impurities from a glycerol contaminated therewith, said impurities boiling slightly above and below the boiling temperature of glycerol, the steps of subjecting said impurity-containing glycerin to a distillation under vacuo, with concurrent steaming of the glycerin, condensing the impurity-containing glycerin distillate, and returning a major portion of said condensate as a reflux without substantial inclusion of the water removed overhead, thereby concentrating the alkali-reactive impurities in the first portion of the glycerin to distill over prior to the separate recovery of the bulk of the glycerol as distillate.

7. A process for the recovery of substantially pure and anhydrous polyhydric alcohol containing only very small and allowable percentages of odorous and alkali-reactive impurities from a polyhydric alcohol containing excessive amounts of said impurities which boil in the neighborhood of the boiling temperature of the polyhydric alcohol, which comprises subjecting said impurity-containing polyhydric alcohol to distillation under vacuo, with concurrent passage of steam through said impurity-containing polyhydric alcohol, recovering the initial distillate thus produced while returning a major portion thereof as reflux, thereby concentrating the impurities in the polyhydric alcohol fraction which is distilled and removed at the beginning of said distillation, continuing said distillation and removal of a portion of the distillate until the overhead fraction contains only small and substantially allowable percentage of said impurities, and distilling the remaining polyhydric alcohol overhead under vacuo and without the use of steam, thereby recovering said substantially pure and anhydrous polyhydric alcohol.

8. In a process for removing odorous and alkali-reactive impurities from a glycerol contaminated therewith, said impurities boiling slightly above and below the boiling point of glycerol, the steps of subjecting said impurity-containing glycerol to a distillation under vacuum and with concurrent blowing of steam through said glycerol, conveying the overhead fraction thus produced into a partial condensation zone maintained under conditions of temperature and pressure such that the glycerol containing the alkali-reactive impurities is liquefied while the steam and most of the odorous bodies removed thereby remain uncondensed, withdrawing a minor portion of the impurity-containing glycerol condensate out of the system, and returning a major portion of said glycerol condensate as reflux, thereby concentrating the alkali-reactive impurities in the first portion of the glycerol to distill over prior to the separate recovery of the bulk of the glycerol as distillate.

9. In a process for removing odorous and alkali-reactive impurities from a polyhydric alcohol contaminated therewith, said alkali-reactive impurities boiling in the neighborhood of the boiling temperature of the polyhydric alcohol, the steps of subjecting said impurity-containing polyhydric alcohol to a distillation under vacuo, with concurrent steaming of the alcohol, condensing the impurity-containing polyhydric alcohol distillate thus formed, and returning a major portion of said condensate as reflux while withdrawing a minor portion of the impurity-containing polyhydric alcohol condensate out of the system, thereby concentrating the alkali-reactive impurities in the first portion of the polyhydric alcohol to distill over prior to the separate recovery of the bulk of the polyhydric alcohol as distillate.

10. In a process for removing alkali-reactive impurities from a polyhydric alcohol contaminated therewith, said impurities boiling substantially in the neighborhood of the boiling temperature of the alcohol, the steps of subjecting said impurity-containing polyhydric alcohol to a vacuum distillation with concurrent blowing of steam through the polyhydric alcohol, condensing the overhead fraction thus produced, withdrawing a minor portion of the impurity-containing polyhydric alcohol condensate out of the system, and returning the remaining major portion of said polyhydric alcohol condensate as reflux, thereby concentrating the alkali-reactive impurities in the first portion of the polyhydric alcohol to distill over prior to the separate recovery of the bulk of the polyhydric alcohol as distillate.

THEODORE W. EVANS.
JAMES R. SCHEIBLI.
GERALD H. van de GRIENDT.